United States Patent
Melatti et al.

(10) Patent No.: US 10,272,909 B1
(45) Date of Patent: Apr. 30, 2019

(54) HYBRID VEHICLE ENGINE START/STOP SYSTEM

(71) Applicant: FORD GLOBAL TECHNOLOGIES, LLC, Dearborn, MI (US)

(72) Inventors: Anthony Melatti, Dearborn, MI (US); Hamid Golgiri, Dearborn, MI (US); Patrick Lawrence Jackson Van Hoecke, Dearborn, MI (US); Danielle Rosenblatt, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/956,123

(22) Filed: Apr. 18, 2018

(51) Int. Cl.
 *B60L 58/13* (2019.01)
 *B60W 20/40* (2016.01)
 *B60W 20/16* (2016.01)
 *B60W 30/182* (2012.01)
 *B60L 11/18* (2006.01)

(52) U.S. Cl.
 CPC .......... *B60W 20/40* (2013.01); *B60L 11/1851* (2013.01); *B60L 11/1861* (2013.01); *B60L 11/1862* (2013.01); *B60W 20/16* (2016.01); *B60W 30/182* (2013.01); *B60W 2510/244* (2013.01); *B60W 2550/12* (2013.01); *B60W 2550/402* (2013.01); *B60W 2550/406* (2013.01)

(58) Field of Classification Search
 CPC .............. B60L 11/1851; B60L 11/1861; B60L 11/1862; B60W 20/16; B60W 30/182; B60W 2510/244; B60W 2550/12
 See application file for complete search history.

(56) References Cited

U.S. PATENT DOCUMENTS

| | | | | |
|---|---|---|---|---|
| 6,166,517 A | * | 12/2000 | Wakashiro | B60K 6/485 180/65.26 |
| 6,634,447 B1 | * | 10/2003 | Matsubara | B60K 6/485 180/65.26 |
| 8,972,088 B2 | | 3/2015 | Kozloski et al. | |
| 9,744,965 B2 | * | 8/2017 | Choi | B60W 20/11 |
| 2012/0197468 A1 | * | 8/2012 | Frederick | B60W 10/06 701/22 |
| 2012/0200257 A1 | * | 8/2012 | Schwarz | H01M 10/42 320/109 |
| 2012/0248869 A1 | * | 10/2012 | Itagaki | B60L 11/1868 307/9.1 |
| 2012/0316713 A1 | * | 12/2012 | Pfefferl | F04C 28/06 701/22 |
| 2013/0006458 A1 | * | 1/2013 | Bhattarai | B60W 50/082 701/22 |
| 2013/0184907 A1 | * | 7/2013 | Whitney | B60W 10/06 701/22 |

(Continued)

FOREIGN PATENT DOCUMENTS

WO 2017149281 A1 9/2017

*Primary Examiner* — Erez Gurari
(74) *Attorney, Agent, or Firm* — David Kelley; Brooks Kushman, P.C.

(57) ABSTRACT

A vehicle includes an engine, a motor, a high voltage traction battery, and a controller. The engine and the motor are each configured to propel the vehicle. The battery is configured to power the motor. The controller is programmed to selectively start the engine based on a state of charge of the battery and air pollution content such that as the air pollution content increases a state of charge engine startup threshold decreases.

20 Claims, 3 Drawing Sheets

(56) References Cited

U.S. PATENT DOCUMENTS

| | | | | |
|---|---|---|---|---|
| 2013/0226389 | A1* | 8/2013 | Yamazaki | B60K 6/445 701/22 |
| 2013/0241485 | A1* | 9/2013 | Snyder | B60L 11/1809 320/109 |
| 2013/0332017 | A1* | 12/2013 | Hisano | B60W 10/06 701/22 |
| 2014/0081490 | A1* | 3/2014 | Adelman | B60K 6/28 701/22 |
| 2014/0114514 | A1* | 4/2014 | Cronnbez | B60W 10/06 701/22 |
| 2015/0219724 | A1* | 8/2015 | Gibbs | G01R 19/16542 324/426 |
| 2015/0331055 | A1* | 11/2015 | Oi | G01R 31/367 702/63 |
| 2016/0014252 | A1* | 1/2016 | Biderman | B60L 15/20 455/420 |
| 2016/0082772 | A1* | 3/2016 | Biderman | A61G 5/045 301/6.5 |
| 2016/0124053 | A1* | 5/2016 | Akaishi | G01R 31/371 701/33.4 |
| 2016/0159229 | A1* | 6/2016 | Enomoto | B60L 11/1816 320/109 |
| 2016/0200310 | A1* | 7/2016 | Amemiya | B60K 6/48 701/22 |
| 2016/0243947 | A1* | 8/2016 | Perkins | B60L 1/003 |
| 2016/0280203 | A1* | 9/2016 | Yang | B60W 10/06 |
| 2017/0015208 | A1* | 1/2017 | Dunlap | B60L 11/1816 |
| 2018/0099577 | A1* | 4/2018 | Nagata | H02J 7/0091 |
| 2018/0147931 | A1* | 5/2018 | Toyota | B60K 6/547 |
| 2018/0281773 | A1* | 10/2018 | Bell | B60W 20/13 |

* cited by examiner

HYBRID VEHICLE ENGINE START/STOP SYSTEM

TECHNICAL FIELD

The present disclosure relates to hybrid vehicles and control systems for hybrid vehicles.

BACKGROUND

Hybrid vehicles may utilize multiple power sources, including an internal combustion engine and an electric machine, to generate power within a powertrain of the hybrid vehicle.

SUMMARY

A vehicle includes and engine, a motor, a high voltage traction battery, and a controller. The engine and the motor are each configured to propel the vehicle. The battery is configured to power the motor. The controller is programmed to selectively start the engine based on a state of charge of the battery and air pollution content such that as the air pollution content increases a state of charge engine startup threshold decreases.

A vehicle includes an engine, a motor, a battery, and a controller. The engine and the motor are each configured to propel the vehicle. The battery is configured to power the motor. The controller is programmed to, responsive to a battery state of charge decreasing to less than a startup threshold while the motor is propelling the vehicle alone, start the engine. The controller is further programmed to, responsive to ambient air conditions exceeding a pollution threshold, decrease the startup threshold from a base value to an adjusted value.

A vehicle includes an engine, a motor, and a controller. The engine and the electric machine are each configured to generate torque. The controller is programmed to, responsive to a torque demand exceeding an upper threshold while the electric machine is generating power alone, start the engine. The controller is further programmed to, responsive to the ambient air conditions exceeding a pollution threshold, increase the upper threshold from a base value to an adjusted value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
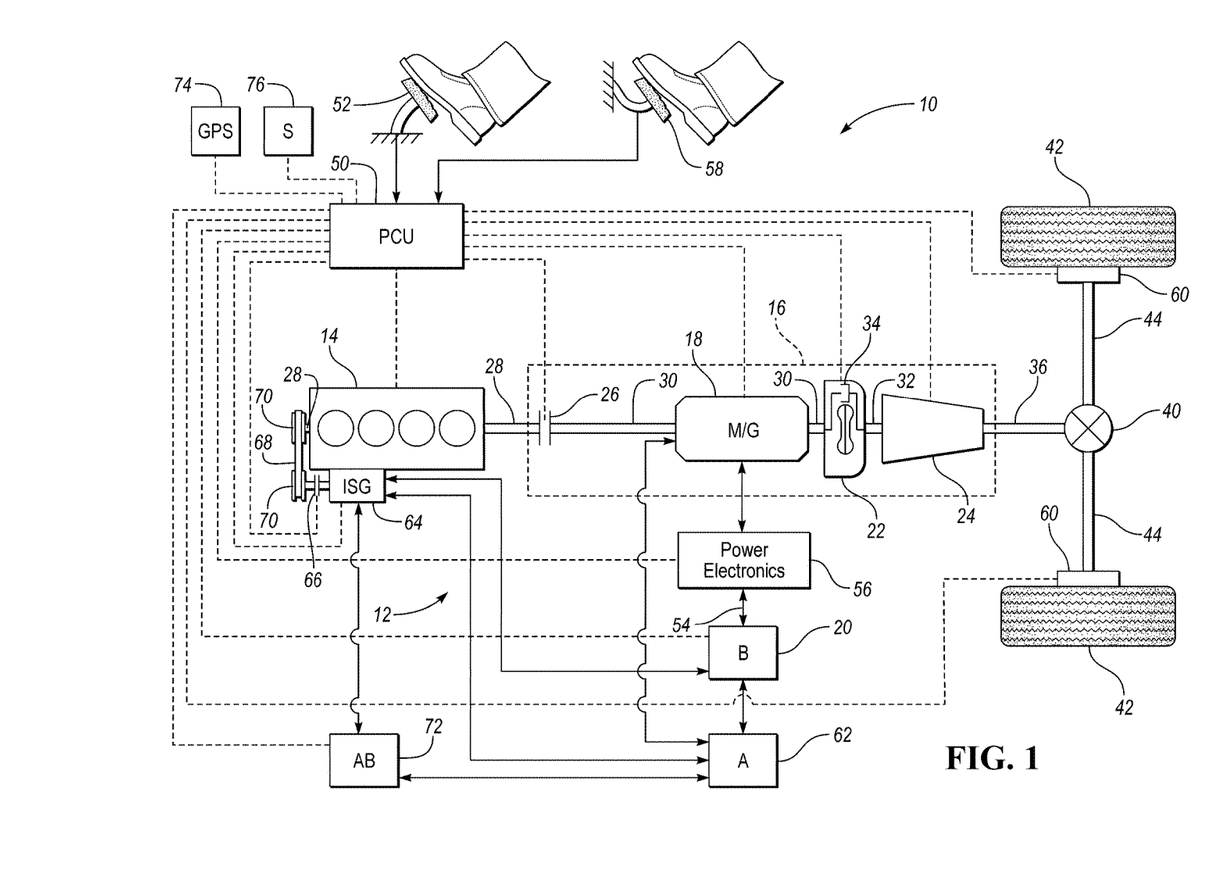
FIG. 1 is a schematic illustration of a representative powertrain of a hybrid electric vehicle.

Referring to FIG. 1, a schematic diagram of a schematic hybrid electric vehicle (HEV) 10 having parallel hybrid powertrain is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). The transmission 16 may be placed in PRNDSL (park, reverse, neutral, drive, sport, low) via transmission range selector. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of drive wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to the powertrain 12 (or more specifically the engine 14 and/or M/G 18) to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque and/or power to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, heating, ventilating, and air conditioning (HVAC) systems, power steering systems, electric heaters, sound systems, radios, entertainment systems, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The HEV 10 may also include global positioning system (GPS) 74 that may be in communication with the controller 50. The GPS 74 may be configured to determine the global coordinates of the HEV 10. The GPS 74 may include road map and an algorithm that is configured to provided directions from a current locating to a desired destination. A human machine interface (HMI) may be configured to receive a desired destination that is input from a vehicle operator. The input may be an address of the desired destination or a general geographical area. The HMI may include a display screen that outputs the current location and a route to the desired destination.

The HEV may also include a pollution or air quality sensor 76 that may be in communication with the controller 50. The air quality sensor may detect carbon monoxide (CO) levels, carbon dioxide ($CO_2$) levels, $NO_x$ gas levels, or any other pollutant levels of the air immediately outside of the car. $NO_x$ gases may include nitric oxide (NO) and nitrogen dioxide ($NO_2$). Upon detection of a pollutant level exceeding an allowable threshold, the HVAC system of the HEV 10 may shut down the flow of incoming air into a cabin of the HEV 10 and switch to a mode that recirculates the air within cabin. The HVAC system may also automatically switch on an advanced air filtration system.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should be further understood that other hybrid vehicle configurations that include both an EV mode (where an electric machine alone powers the vehicle) and a hybrid mode (where an engine and an electric machine both power the vehicle) should be construed as disclosed herein. Other vehicle configurations may include, but are not limited to, series hybrid vehicles, parallel hybrid vehicles, series-parallel hybrid vehicles, plug-in hybrid electric vehicles (PHEVs), or any other hybrid vehicle configuration known to a person of ordinary skill in the art.

In areas that are sensitive to air pollution (e.g., low-lying cities with little wind and densely populated cites), there is a need to reduce emissions from gasoline engines. Electric vehicles are beginning to combat the emission problem, but many hybrid vehicles still possess gasoline engines that are capable of producing emissions. In order to reduce emissions of hybrid vehicles in areas that are sensitive to air pollution, the hybrid vehicle may avoid or reduce running the gasoline engine where the air is already considered to be polluted. If it is determined that the current area is heavily polluted then the hybrid vehicle may enter the EV mode operation to reduce emissions. Furthermore, if it is determined that the current area is heavily polluted then the hybrid vehicle may introduce more extreme limits (e.g., battery state of charge limits or torque demand limits) to prevent the vehicle from exiting the EV mode and starting the engine 14 (whether the transition is to the hybrid mode or to an engine only mode where the engine 14 is operating and the M/G 18 is shutdown).

Figures 2, 3:
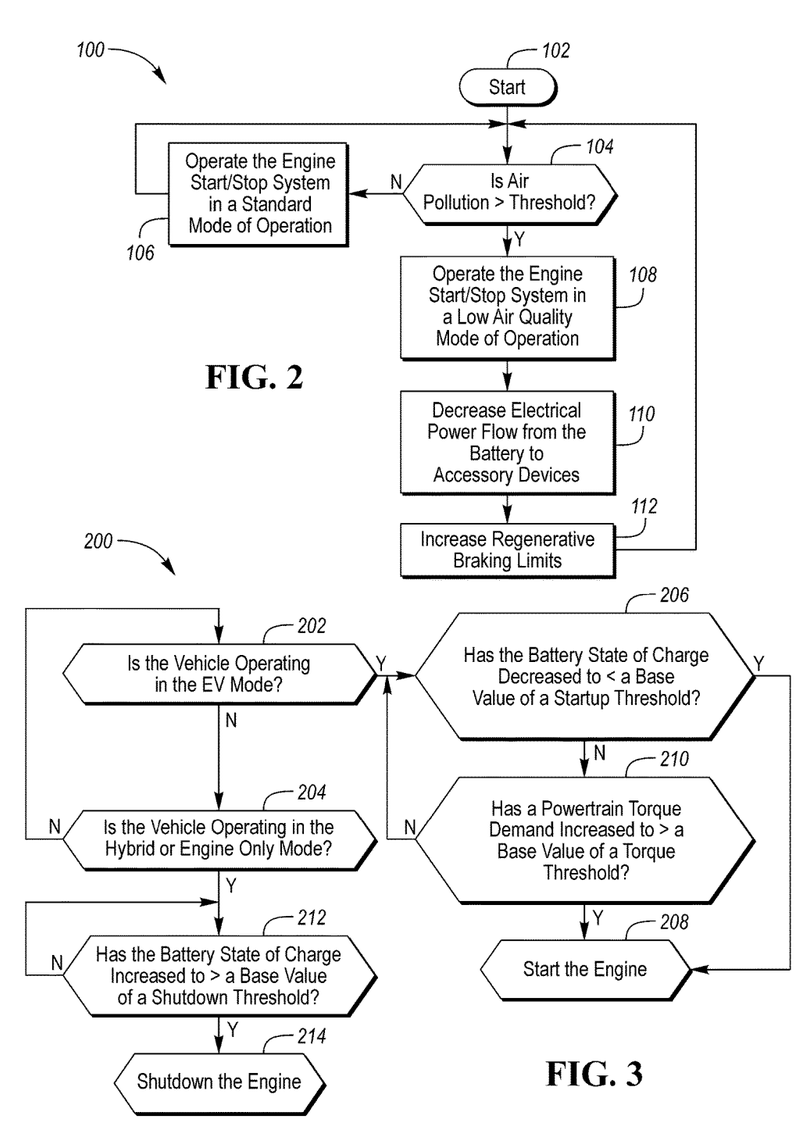
FIG. 2 is a flowchart illustrating a method of controlling a start/stop system of an engine.
FIG. 3 is a flowchart illustrating control of the start/stop system according to a standard mode of operation.

Referring to FIG. 2, a flowchart for a method 100 of controlling a start/stop function of an engine is illustrated. The method 100 may be utilized by any type of hybrid vehicle that includes both an engine and an electric machine that are each configured to generate torque and power within the powertrain of the vehicle. For simplification purposes, however, the HEV 10 in FIG. 1 will be referenced while describing the steps of the method 100. The method 100 may be stored as control logic or algorithms in one or more controllers (e.g., controller 50). The one or more controllers may be programmed to implement the method 100 via sending output signals to various components to control the various components based on various conditions or states of the hybrid vehicle (or based on the conditions or states of the various subcomponents or subsystems of the hybrid vehicle) received by the one or more controllers via input signals.

The method 100 begins at start block 102. The method 100 may be initiated once an ignition of the HEV 10 is turned to an "on" position. Next, the method 100 moves on to block 104 where it is determined if the air pollution content of the immediate area surrounding of the HEV 10 is greater than a threshold. Alternatively stated, block 104 determines if the ambient air conditions exceed a pollution threshold. Air pollution content may refer to the content of carbon monoxide (CO) levels, carbon dioxide ($CO_2$) levels, $NO_x$ gas levels, or any other pollutant levels of the air immediately outside of the car. The air pollution content may be determined by the air quality sensor 76 or may be based on the current location of the HEV 10 relative to a generated air quality map. The air quality map may be generated based on previous recordings of air pollution content by the air quality sensor 76. The previous recordings of air pollution content may then be mapped to specific locations via the GPS 74. Alternatively, the air quality map may be generated by crowd sourcing data (e.g., by uploading it to the cloud) of air pollution content within specific geographical areas. The crowd sourcing data may be provided by other vehicles or external agencies/organizations, such as the environmental protection agency (EPA). The map data may include GPS coordinates and air quality data in the form of a continuum, or discrete/qualitative values. The data can be used to determine several types of air quality issues, in the time domain such as transient/temporary low air quality, long-term low air quality, and cyclic low air quality. The data can be analyzed over time to determine what factors cause low air quality. The data can also be used to sufficiently charge the battery 20 in preparation of entering low air quality zone to reduce emissions in such a zone. Sufficiently charging the battery in preparation of entering a low air quality zone (preparation mode) can assume a variety of forms based on hardware and software controls strategies. On the battery side, electrical power limits to and from the battery and battery thermal control strategies can be changed in the software controls to allow for greater electric regen and reduced electric use in a preparation mode. On the powertrain hardware, engine, motor, and transmission software controls can be temporarily altered during a preparation mode to provide more regenerative braking energy and to enable higher engine, motor, and transmission performance to convert more gasoline energy to electric energy.

If the air pollution content of the immediate area surrounding of the HEV 10 is not greater than a pollution threshold, the method 100 moves on from block 104 to block 106 where the engine start/stop system (i.e., the control logic within the controller 50 that controls starting and stopping the engine 14 to transition between the engine only or hybrid modes of operation and the EV mode operation) is operated according to a standard mode of operation. If the air pollution content of the immediate area surrounding of the HEV 10 is greater than the pollution threshold, the method 100 moves from block 104 to block 108 where the engine start/stop system is operated according to a low air quality mode of operation. Once the engine start/stop system is operating in the low air quality mode of operation the electrical power delivered to the accessories 62 may also be decreased at block 110 in order conserve the electrical energy of the traction battery 20. The decrease in electrical power delivered to the accessories 62 may be a set amount or may be in proportion to the amount of air pollution content.

The method 100 then moves on to block 112, where an increase in the capability of the HEV 10 to regenerate its electrical power through regenerative braking may be requested to ensure that the vehicle has sufficient battery energy or charge to operate in an EV only mode in an area where air pollution is above the threshold. The battery regenerative amperage limits to receive electrical power may be raised in one or more controllers (e.g., controller 50), and motor regenerative torque limits may also be raised in one or more controllers (e.g., controller 50).

The method 100 will continue to recycle back to block 104 from block 106 once the start/stop system is being operated according to a standard mode of operation in order facilitate a change to the air quality mode of operation, which may occur if it is determined that the air pollution content of the immediate area surrounding of the HEV 10 becomes greater than the pollution threshold. The method 100 will also continue to recycle back to block 104 from block 112 once the start/stop system is being operated according to a low air quality mode of operation in order facilitate a change to the standard mode of operation, which may occur if it is determined that the air pollution content of the immediate area surrounding of the HEV 10 becomes less than the pollution threshold.

Referring now to FIG. 3, a flowchart illustrating control of the start/stop system according to the standard mode of operation 200 (implemented at block 106 in FIG. 2) is illustrated. The steps of controlling the start/stop system according to a standard mode of operation 200 may be stored as control logic or algorithms in one or more controllers (e.g., controller 50). The one or more controllers may be programmed to implement the standard mode of operation of the start/stop system 200 via sending output signals to various components to control the various components based on various conditions or states of the hybrid vehicle (or based on the conditions or states of the various subcomponents or subsystems of the hybrid vehicle) received by the one or more controllers via input signals.

The standard mode of operation of the start/stop system 200 begins at block 202 where it is where it is determined if the HEV 10 (or more specifically the powertrain 12) is operating in the EV mode where the engine 14 is shutdown and the M/G 18 is generating power within the powertrain 12 alone. If it is determined that the HEV 10 (or more specifically the powertrain 12) is not operating in the EV mode at block 202, the standard mode of operation of the start/stop system 200 moves on to block 204 where it is determined if the HEV 10 is operating the in hybrid mode where both the engine 14 and the M/G 18 are generating power within the powertrain 12 or in the engine only mode where the engine 14 is generating power within the powertrain 12 alone. If it is determined that the HEV 10 is not operating in the hybrid or engine only mode at block 204, the standard mode of operation of the start/stop system 200 recycles back to the beginning of block 202.

Returning to block 202, if it is determined that the HEV 10 is operating in the EV mode, the standard mode of operation of the start/stop system 200 moves on to block 206 where it is determined if a state of charge of the battery 20 has decreased to less than a base value of a startup threshold (the startup threshold may be a lower threshold for a range of the state of charge of the battery 20 where the HEV 10 is permitted to operate in the EV mode). If it is determined that the state of charge of the battery 20 has decreased to less than the base value of the startup threshold at block 206, the standard mode of operation of the start/stop system 200 moves on to block 208 where the engine 14 is commanded to start. If it is determined that the state of charge of the battery 20 has not decreased to less than the base value of the startup threshold at block 206, the standard mode of operation of the start/stop system 200 moves on to block 210 where it is determined if a powertrain torque demand (i.e., a requested torque that is to be generated within the powertrain by the engine 14 and/or the M/G 18) has increased to (or exceeded) a base value of a torque threshold (the torque threshold may be an upper torque threshold of the torque demand where the HEV 10 is permitted to operate in the EV mode). If the powertrain torque demand has exceeded the base value of the torque threshold, the standard mode of operation of the start/stop system 200 moves on to block 208 where the engine 14 is commanded to start. Since exceeding the upper torque threshold results in starting the engine 14 at block 208, the upper torque threshold may also be referred to an engine startup torque threshold. If the powertrain torque demand has not exceeded the torque threshold, the standard mode of operation of the start/stop system 200 recycles back to the beginning of block 206. It should also be understood that blocks 206 and 210 are not necessarily shown in chronological order. Block 210 may be initiated prior to block 206 or blocks 206 and 210 may be operated simultaneously.

Returning to block 204, if it is determined that the HEV 10 is operating in the hybrid or engine only mode, the standard mode of operation of the start/stop system 200 moves on to block 212 where it is determined if the state of charge of the battery 20 has increased to greater than a base value of a shutdown threshold (the shutdown threshold may be a hysteresis value of the state of charge of the battery 20 that corresponds to a value that is sufficiently greater than the startup threshold to ensure that the HEV 10 will remain in the EV mode for a sufficient amount of time to prevent excessive starts and stops of the engine 14, which may lead to decreased fuel efficiency). If it is determined if the state of charge of the battery 20 has not increased to greater than the base value of the shutdown threshold, the standard mode of operation of the start/stop system 200 recycles back to the beginning of block 212. If it is determined if the state of charge of the battery 20 has increased to greater than the base value of the shutdown threshold, the standard mode of operation of the start/stop system 200 moves on to block 214 where the engine 14 is commanded to shutdown.

Figure 4:
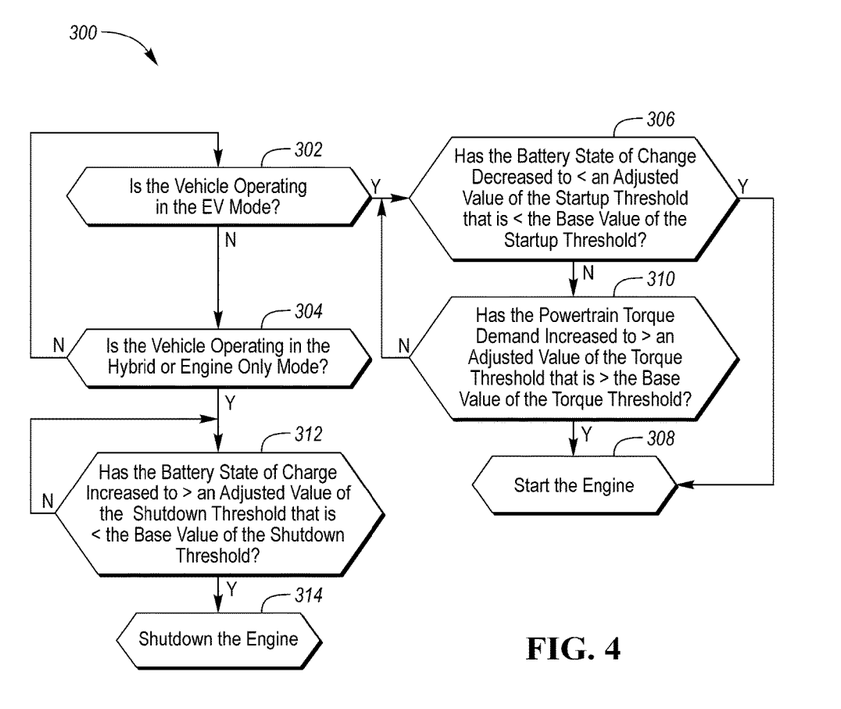
FIG. 4 is a flowchart illustrating control of the start/stop system according to a low air quality mode of operation.

Referring now to FIG. 4, a flowchart illustrating control of the start/stop system according to the low air quality mode of operation 300 (implemented at block 108 in FIG. 2) is illustrated. The steps of controlling the start/stop system according to the low air quality mode of operation 300 may be stored as control logic or algorithms in one or more controllers (e.g., controller 50). The one or more controllers may be programmed to implement the low air quality mode of operation of the start/stop system 300 via sending output signals to various components to control the various components based on various conditions or states of the hybrid vehicle (or based on the conditions or states of the various subcomponents or subsystems of the hybrid vehicle) received by the one or more controllers via input signals.

The low air quality mode of operation of the start/stop system 300 begins at block 302 where it is where it is determined if the HEV 10 (or more specifically the powertrain 12) is operating in the EV mode where the engine 14 is shutdown and the M/G 18 is generating power within the powertrain 12 alone. If it is determined that the HEV 10 (or more specifically the powertrain 12) is not operating in the EV mode at block 302, the low air quality mode of operation of the start/stop system 300 moves on to block 304 where it is determined if the HEV 10 is operating in the hybrid mode where both the engine 14 and the M/G 18 are generating power within the powertrain 12 or in the engine only mode where the engine 14 is generating power within the powertrain 12 alone. If it is determined that the HEV 10 is not operating in the hybrid or engine only mode at block 304, the low air quality mode of operation of the start/stop system 300 recycles back to the beginning of block 302.

Returning to block 302, if it is determined that the HEV 10 is operating in the EV mode, the low air quality mode of operation of the start/stop system 300 moves on to block 306 where it is determined if the state of charge of the battery 20 has decreased to less than an adjusted value of the startup threshold, which is less than the base value of the startup threshold. If it is determined that the state of charge of the battery 20 has decreased to less than the adjusted value of the startup threshold at block 306, the low air quality mode of operation of the start/stop system 300 moves on to block 308 where the engine 14 is commanded to start. If it is determined that the state of charge of the battery 20 has not decreased to less than the adjusted value of the startup threshold at block 306, the low air quality mode of operation of the start/stop system 300 moves on to block 310 where it is determined if the powertrain torque demand has increased to (or exceeded) an adjusted value of the torque threshold, which is greater than the base value of the torque threshold. If the powertrain torque demand has exceeded the adjusted value torque threshold, the low air quality mode of operation of the start/stop system 300 moves on to block 308 where the engine 14 is commanded to start. If the powertrain torque demand has not exceeded the adjusted value of the torque threshold, the low air quality mode of operation of the start/stop system 300 recycles back to the beginning of block 306. It should also be understood that blocks 306 and 310 are not necessarily shown in chronological order. Block 310 may be initiated prior to block 306 or blocks 306 and 310 may be operated simultaneously.

Returning to block 304, if it is determined that the HEV 10 is operating in the hybrid or engine only mode, the low air quality mode of operation of the start/stop system 300 moves on to block 312 where it is determined if the state of charge of the battery 20 has increased to greater than an adjusted value of the shutdown threshold, which is less than the base value of the shutdown threshold. If it is determined if the state of charge of the battery 20 has not increased to greater than the adjusted value of the shutdown threshold, the low air quality mode of operation of the start/stop system 300 recycles back to the beginning of block 312. If it is determined if the state of charge of the battery 20 has increased to greater than the adjusted value of the shutdown threshold, the low air quality mode of operation of the start/stop system 300 moves on to block 314 where the engine 14 is commanded to shutdown.

The method 100 depicted in FIG. 2 facilitates switching between the standard mode of operation of the start/stop system 200 depicted in FIG. 3 and the low air quality mode of operation of the start/stop system 300 depicted in FIG. 4. A switch from the standard mode of operation of the start/stop system 200 to the low air quality mode of operation of the start/stop system 300 corresponds to decreasing the engine startup threshold for the state of charge of the battery 20 from the base value to the adjusted value, increasing the engine startup torque threshold for the powertrain torque demand from the base value to the adjusted value, and decreasing the engine shutdown threshold for the state of charge of the battery 20 from the base value to the adjusted value. A switch from the low air quality mode of operation of the start/stop system 300 to the standard mode of operation of the start/stop system 200 corresponds to increasing the engine startup threshold for the state of charge of the battery 20 from the adjusted value to the base value, decreasing the engine startup torque threshold for the powertrain torque demand from the adjusted value to the base value, and increasing the engine shutdown threshold for the state of charge of the battery 20 from the adjusted value to the base value.

Alternatively, the engine startup threshold for the state of charge of the battery 20 may decrease proportionally in response to an increase in air pollution and increase proportionally in response to a decrease in air pollution; the engine startup torque threshold for the powertrain torque demand may increase proportionally in response to an increase in air pollution and decrease proportionally in response to a decrease in air pollution; and the engine shutdown threshold for the state of charge of the battery 20 may decrease proportionally in response to an increase in air pollution and increase proportionally in response to a decrease in air pollution.

The difference between the startup threshold (whether it be the base or adjusted value) and the shutdown threshold (whether it be the base or adjusted value) may be referred to as a "hysteresis zone" that is designed to prevent an immediate startup after a shutdown or an immediate shutdown after a startup. The "hysteresis zone" may remain relatively constant. Therefore, under a scenario where the startup threshold has been temporarily increased, the shutdown threshold may also temporarily increase by approximately the same amount. Also, under a scenario where the shutdown threshold has temporarily decreased, the startup threshold may also temporarily decrease by approximately the same amount.

It should be understood that the flowcharts in FIGS. 2-4 are for illustrative purposes only and that the method 100, the standard mode of operation of the start/stop system 200, and low air quality mode of operation of the start/stop system 300 should not be construed as limited to the flowcharts in FIG. 2-4. Some of the steps of the method 100, the standard mode of operation of the start/stop system 200, and/or low air quality mode of operation of the start/stop system 300 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an engine and a motor each configured to propel the vehicle;
a battery configured to power the motor; and
a controller programmed to selectively start the engine based on a state of charge of the battery and air pollution content such that as the air pollution content increases a state of charge engine startup threshold decreases.

2. The vehicle of claim 1, wherein the controller is further programmed to selectively shutdown the engine based on a state of charge of the battery and the air pollution content such that as the air pollution content increases a state of charge engine shutdown threshold decreases.

3. The vehicle of claim 1, wherein the controller is further programmed to selectively start the engine based on a torque demand and the air pollution content such that as the air pollution content increases a torque demand engine startup threshold increases.

4. The vehicle of claim 1, wherein the controller is further programmed to selectively decrease an electrical power flow from the battery to accessory devices based on the air pollution content such that as the air pollution content increases the electrical power flow from the battery to accessory devices decreases.

5. A vehicle comprising:
an engine and a motor each configured to propel the vehicle;
a battery configured to power the motor; and
a controller programmed to,
responsive to a battery state of charge decreasing to less than a startup threshold while the motor is propelling the vehicle alone, start the engine, and
responsive to ambient air conditions exceeding a pollution threshold, decrease the startup threshold from a base value to an adjusted value.

6. The vehicle of claim 5, wherein the controller is further programmed to, responsive to the ambient air conditions exceeding the pollution threshold and the battery state of charge decreasing to less than the adjusted value while the motor is propelling the vehicle alone, start the engine.

7. The vehicle of claim 5, wherein the controller is further programmed to, responsive to both the engine and motor propelling the vehicle and the battery state of charge increasing to greater than a shutdown threshold, shutdown the engine.

8. The vehicle of claim 7, wherein the controller is further programmed to, responsive to the ambient air conditions exceeding the pollution threshold, decrease the shutdown threshold from a second base value to a second adjusted value.

9. The vehicle of claim 8, wherein the controller is further programmed to, responsive to the ambient air conditions exceeding the pollution threshold and the battery state of charge increasing to greater than the second adjusted value while both the engine and motor are propelling the vehicle, shutdown the engine.

10. The vehicle of claim 5, wherein the controller is further programmed to, responsive to a torque demand increasing to greater than an upper threshold while the motor is generating power alone, start the engine.

11. The vehicle of claim 10, wherein the controller is further programmed to, responsive to the ambient air conditions exceeding the pollution threshold, increase the upper threshold from a second base value to a second adjusted value.

12. The vehicle of claim 11, wherein the controller is further programmed to, responsive to the ambient air conditions exceeding the pollution threshold and the torque demand increasing to greater than the second adjusted value while the motor is generating power alone, start the engine.

13. The vehicle of claim 5, wherein the controller is further programmed to, responsive to the ambient air conditions exceeding the pollution threshold decrease an electrical power flow from the battery to accessory devices.

14. A vehicle comprising:
an engine and an electric machine each configured to generate torque; and
a controller programmed to,
responsive to a torque demand exceeding an upper threshold while the electric machine is generating power alone, start the engine, and
responsive to ambient air conditions exceeding a pollution threshold, increase the upper threshold from a base value to an adjusted value.

15. The vehicle of claim 14, wherein the controller is further programmed to, responsive to the ambient air conditions exceeding the pollution threshold and the torque demand increasing to greater than the adjusted value while the electric machine is generating power alone, start the engine.

16. The vehicle of claim 14, wherein the controller is further programmed to, responsive to a battery state of charge decreasing to less than a startup threshold while the electric machine is propelling the vehicle alone, start the engine.

17. The vehicle of claim 16, wherein the controller is further programmed to, responsive to the ambient air conditions exceeding a pollution threshold, decrease the startup threshold from a second base value to a second adjusted value.

18. The vehicle of claim 17, wherein the controller is further programmed to, responsive to the ambient air conditions exceeding the pollution threshold and the battery state of charge decreasing to less than the second adjusted value while the electric machine is propelling the vehicle alone, start the engine.

19. The vehicle of claim 14, wherein the controller is further programmed to, responsive to both the engine and motor propelling the vehicle and a battery state of charge increasing to greater than a shutdown threshold, shutdown the engine.

20. The vehicle of claim 19, wherein the controller is further programmed to, responsive to the ambient air conditions exceeding the pollution threshold, decrease the shutdown threshold from a second base value to a second adjusted value.

* * * * *